United States Patent
Guémas

(10) Patent No.: US 6,314,113 B1
(45) Date of Patent: Nov. 6, 2001

(54) METHOD OF DETERMINING A SYMBOL TRANSMISSION FORMAT IN A TRANSMISSION SYSTEM AND SYSTEM

(75) Inventor: Philippe Guémas, Montgeron (FR)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/083,696

(22) Filed: May 21, 1998

(30) Foreign Application Priority Data

May 27, 1997 (FR) .................................................. 97 06466

(51) Int. Cl.[7] ......................................................... H04J 1/00
(52) U.S. Cl. ........................... 370/480; 370/281; 370/208
(58) Field of Search ................................. 370/480, 280, 370/281, 347, 209, 503, 203, 330, 210, 206, 208, 204; 375/259, 200, 343, 146, 340, 219, 215, 344; 342/380; 704/226; 348/478

(56) References Cited

U.S. PATENT DOCUMENTS

| 5,559,833 | * | 9/1996 | Hayet ...................................... 375/259 |
| 5,602,833 | * | 2/1997 | Zehavi .................................... 370/209 |
| 5,745,484 | * | 4/1998 | Scott ...................................... 370/347 |
| 5,751,761 | * | 5/1998 | Gilhousen ............................. 375/200 |
| 5,903,614 | * | 5/1999 | Suzuki et al. ........................ 375/340 |
| 5,959,980 | * | 9/1999 | Scott .................................... 370/280 |
| 6,088,406 | * | 7/2000 | Suzuki ................................... 375/343 |
| 6,125,124 | * | 9/2000 | Junell et al. ......................... 370/503 |

FOREIGN PATENT DOCUMENTS

| 8257422 | 8/1997 | (EP) . |
| WO9726742 | 7/1997 | (WO) . |
| WO 97/26742 | * 7/1997 | (WO) ............................ H04L/27/26 |

\* cited by examiner

*Primary Examiner*—Douglas Olms
*Assistant Examiner*—Ricardo M. Pizarro
(74) *Attorney, Agent, or Firm*—David R. Treacy

(57) ABSTRACT

A method and apparatus for determining the transmission format of complex symbols in a received signal which is formatted in complex symbol blocks. Each block has a first occurrence ($GI_k$) of a sequence of complex symbols and second occurrence ($gI_k$) of the same sequence of complex symbols. A correlation between the first and second occurrences is effected by means of acquisition and correlation time windows, the transmission format being determined by searching for maximum correlation between the first complex symbol sequence and the second complex symbol sequence via synchronization of the windows with the received signal so that the windows select the first occurrence and the second occurrence of complex symbols, respectively. Particularly useful in a digital transmission system employing Orthogonal Frequency Division Multiplexing (OFDM).

8 Claims, 6 Drawing Sheets

METHOD OF DETERMINING A SYMBOL TRANSMISSION FORMAT IN A TRANSMISSION SYSTEM AND SYSTEM

FIELD OF THE INVENTION

The invention relates to a method of determining a transmission format for complex symbols in a signal formatted in complex symbol blocks, which method can be applied to a transmission system, each block having a first occurrence of a group of complex symbols and a second occurrence of the same group of complex symbols, the two occurrences having a like duration, the method effecting a correlation between the first occurrence and the second occurrence for determining characteristic features of the transmission format.

The invention also relates to a system and a receiver implementing the method. The method is used for receiving signals transmitted, for example, in an orthogonal frequency-division multiplexing mode, notably transmitted by radio, by cable, by satellite, for example for digital television applications.

BACKGROUND OF THE INVENTION

The signals transmitted in the orthogonal frequency-division multiplexing mode will hereinafter be identified by the short name of OFDM (Orthogonal Frequency-Division Multiplexing). The OFDM technique consists of splitting up a transmit information signal by spreading it over a large number of digital low-rate channels. Thus a strongly selective wideband channel is transformed into a large number of non-selective digital channels. As they all form one wideband channel, it is not very likely that fadings simultaneously affect the whole channel in the course of the transmission. This technique also permits of reducing intersymbol interference. Thus, one frequency corresponds with each digital channel, while all the frequencies are symmetrically spread around one central carrier frequency. As it is hardly acceptable to use selective filters at the receiver end, it is preferred to tolerate an overlap of the spectrums, but while imposing conditions of orthogonality between the frequencies to eliminate the intersymbol interference at the sampling instants.

The OFDM signal is organized in frames formed by blocks of which certain blocks are service blocks and others are data blocks. To avoid intersymbol interference, each block contains redundancy data. A random block is formed by all the OFDM frequencies used by the system, the frequencies being modulated by digital transmit symbols caused by a coded modulation, for example, a digital PSK or QAM modulation. At the transmitter end, these symbols areas coded in accordance with a certain format and with a certain timing which is to be detected at the receiver end so that they can be decoded correctly. Thus, at the receiver end, the received signals are to be demodulated and then decoded to restore the original data. The invention proposes to retrieve the essential characteristic features of the transmission format used for the transmission.

European patent EP 608 024 which corresponds to U.S. Pat. No. 5,559,833, issued Sept. 24, 1996, assigned to U.S. Philips Corporation, describes a digital transmission system which has a timing recovery of OFDM signals. This document exploits the two occurrences of a like group of symbols which appear in an OFDM signal. A correlation is established between these two occurrences by delaying one of the occurrences by a constant delay. Indeed, this document considers this delay to be known, which is not the case in all the applications of this technique. The device thus described recovers the timing of the symbols on the basis of a local clock, on a frequency division and on a control by a phase-locked loop. Moreover, the correlation utilizes a technique of subtraction which necessitates the use of much memory capacity.

SUMMARY OF THE INVENTION

It is an object of the invention to permit the recovery of complex symbols notably organized in OFDM blocks working without reference, without knowing the transmission format a priori.

This object is achieved with a method of recovering complex symbols which method comprises the following steps:

storage of a first sequence of complex symbols taken from the received signal via an acquisition time window which has a longer duration than the duration of the occurrences of complex symbols, correlation of the first sequence of complex symbols with a second sequence of complex symbols selected at another moment in the received signal, via a correlation time window which has a duration equal to that of the acquisition time window, determination of characteristics of the transmission format by searching for maximum correlation between the first and the second sequences of complex symbols by synchronizing the acquisition window with the received signal and by positioning the windows relative to each other in time, the maximum correlation appearing when the first and second sequences of complex symbols include said first and second occurrences, respectively.

More particularly, while the signal is an orthogonal frequency division multiplexing signal called OFDM signal, the method determines a number of orthogonal frequencies included in at least one transmission format of the OFDM signal.

The invention likewise relates to a transmission system for transmitting an orthogonal frequency-division multiplexing signal called OFDM signal, the system comprising transmission means for transmitting said signal formatted in blocks of complex symbols in accordance with a transmission format, each block comprising a first occurrence of a group of complex symbols and a second occurrence of the same group of complex symbols, the two occurrences having a like duration, and receiving means comprising correlation means for determining a correlation between the first occurrence and the second occurrence and determining characteristic features of the transmission format, characterized in that the receiving means comprise:

means for selecting and storing a first sequence of complex symbols selected, in the received signal via an acquisition time window which has a duration that is longer than the duration of the occurrence of complex symbols, means for selecting a second sequence of complex symbols which is selected at another moment in the received signal via a correlation time window which has a duration equal to that of the acquisition time window, the correlation means effecting the correlation between the first sequence and the second sequence of complex symbols, means for determining the characteristic features of the transmission format by searching for maximum correlation between the first sequence and the second sequence of complex symbols by synchronizing the acquisition window with the received signal and by positioning the windows with respect to each other in time, the maximum correlation occurring when the first and the second sequence of complex symbols include said first and second occurrences, respectively.

More particularly, the receiving means comprises a plurality of parallel-arranged channels which permit determination of a plurality of transmission formats. Preferably, the channels work simultaneously. The invention also relates to the receiver used in such a system.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
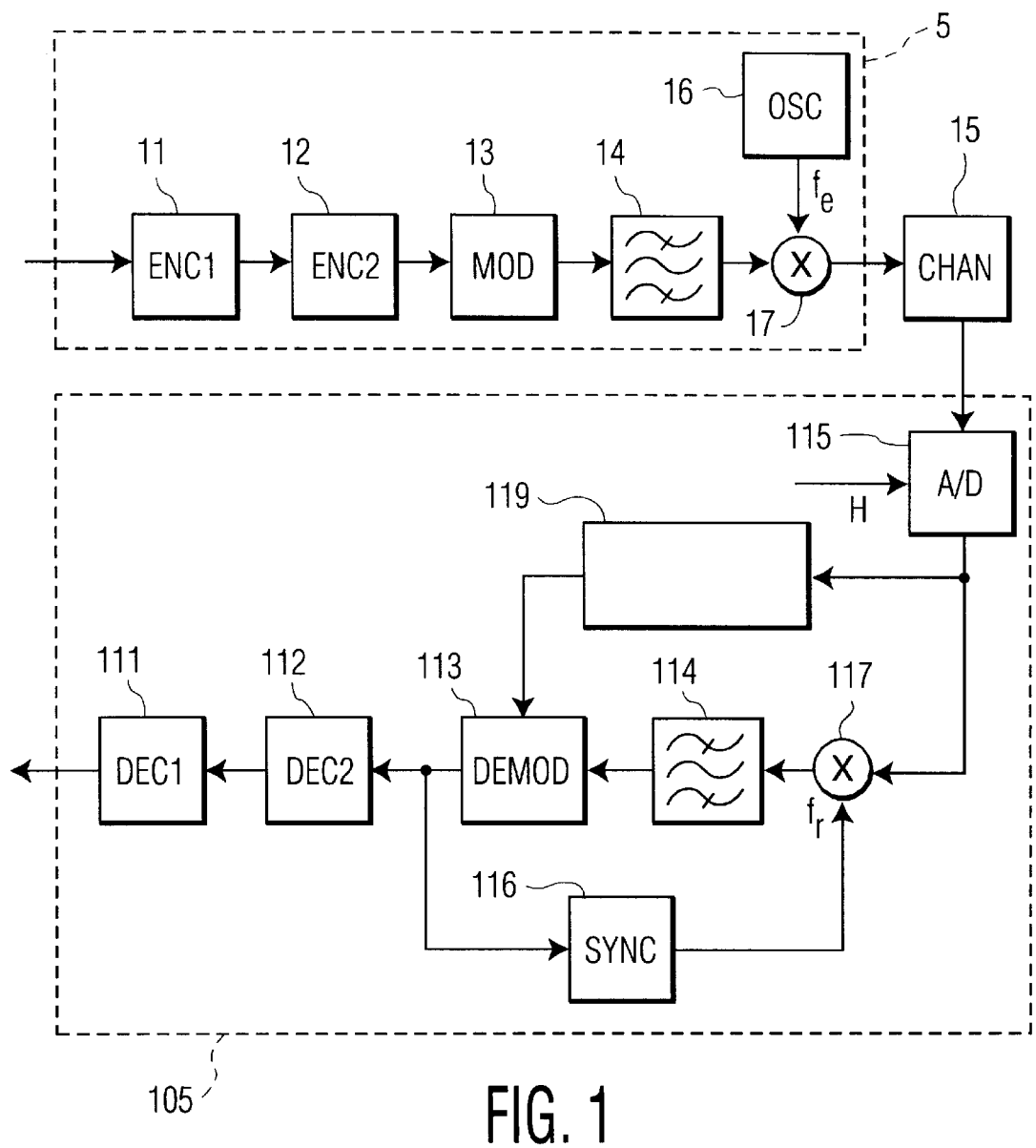
FIG. 1 shows a block diagram of a transmitter/receiver system for digital signals.

FIG. 1 represents a block diagram of a digital transmission system formed by a transmitter 5 and a receiver 105 which communicate along a channel CHAN 15. This channel may represent radio links, satellite links or cable links. The transmitter 5 comprises in a series combination:

a source coder ENC1 11 (which may be omitted), a channel coder ENC 12, an OFDM modulator MOD 13, a transmission filter 14, an oscillator OSC 16 which generates a carrier $f_e$, a mixer 17 mixing the output signal of the transmission filter with the carrier $f_e$.

The samples delivered by the source coder 11 are coded by the channel coder 12 to make them invulnerable to the imperfections of the channel. The modulator 13 then adapts the digital samples to the transmission channel.

At the receiver end, the receiver 105 performs reverse operations to those performed at the transmitter end. Therefore, the receiver comprises (at the output of channel a sampler 115 working at the sample clock rate H of the signal, a mixer 117 which multiplies the samples of the received signal by a regenerated local carrier $f_r$, a receive filter 114, an OFDM demodulator 113, a channel decoder DEC2 112, a source decoder DEC1 111 (if there is a source decoder at a transmitter end), a carrier synchronization device SYNC 116 which generates the regenerated carrier $f_r$, a time synchronization device 119 intended for recovering the timing of the blocks of the OFDM symbols.

The invention relates to the time synchronization (device 119) and not to the carrier synchronization (device 116).

For clarity of the description, the known mechanisms used at the transmitter and receiver ends are explained first.

Figure 2:
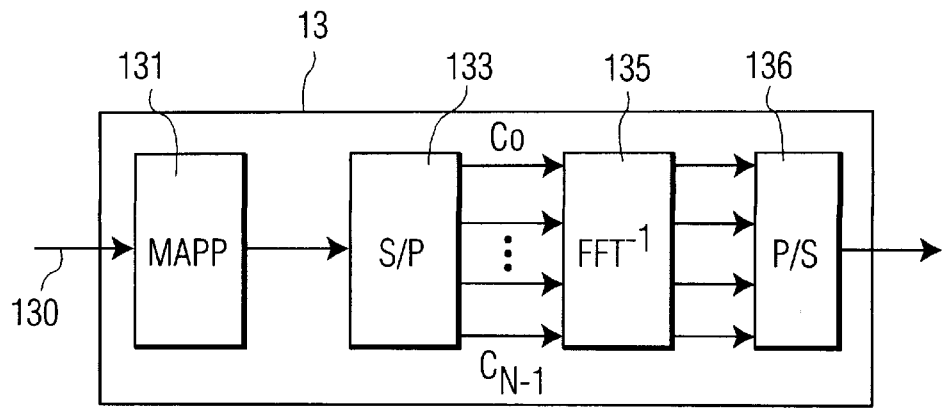
FIG. 2 shows a diagram of a modulator, FIG. 3 gives a representation of the location of the complex symbols in the correlation memory.

FIG. 2 represents the diagram of the modulator 13. The digitized input data present at the input 130 are fed to a bit allocation element 131 MAPP which spreads the input data into coded symbols of a constellation. The coded symbols which appear in series on an output of the element 131 undergo a series-to-parallel conversion S/P 133 and lead to packets of blocks of N complex symbols $C_k$ (0 k N−1). A complex symbol $C_k$ is used for modulating a carrier having a frequency $f_k$, where $f_k$=k/T (because of the orthogonality), where T is the duration of an OFDM symbol and k is the index of the carrier. The combination of all the carriers $f_k$, modulated for generating the coarse OFDM signal, boils down to performing an inverse Fourier transform in a device 135. In the particular case where N is a power of 2, the inverse Fourier transform may be performed while utilizing the inverse fast Fourier transform algorithm ($FFT^{-1}$) as indicated in FIG. 2. This makes it possible to reduce the complexity of the circuit. The N signals coming from the device 135 undergo a parallel-to-serial conversion 136. these modulation techniques are known to a person of ordinary skill in the art.

Figure 4:
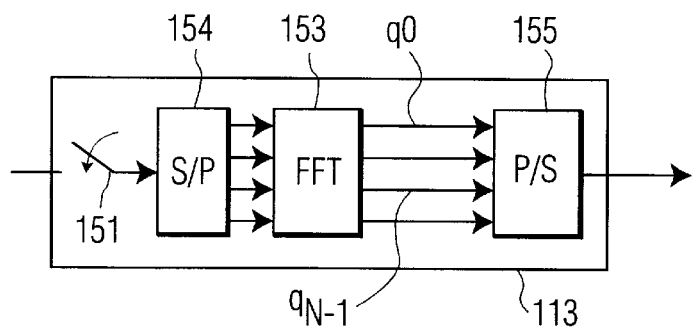
FIG. 4 shows a diagram of a demodulator.

FIG. 4 represents the receiver-end demodulator 113 which carries out the reverse operations to those carried out at the transmitter end. Therefore, it comprises a sampler 151 which works at a rate N/T where N is the total number of carriers of the OFDM channel and 1/T is the symbol frequency. The samples thus taken undergo a series/parallel conversion 154 and are then fed to a device 153 which performs a discrete Fourier transform (preferably fast Fourier transform FFT) to deliver in parallel the samples $q_k$ (0 k N−1) which undergo a parallel-to-serial conversion in a device 155.

For certain applications, the number of OFDM carriers is known at the receiver end which implies that the size of the FFT is also known. But, nevertheless, the receiver is to determine the rate of the OFDM symbols and also the structure of the OFDM symbols.

For other applications, the transmitter may use various transmission formats, thus use different numbers of carriers. In this case, the receiver is further to use a method of determining on how many carriers the transmission is effected.

In the two cases, the time synchronization device works without reference, that is to say, that it only has received OFDM symbols and does not receive help from specific control signals.

Figure 6:
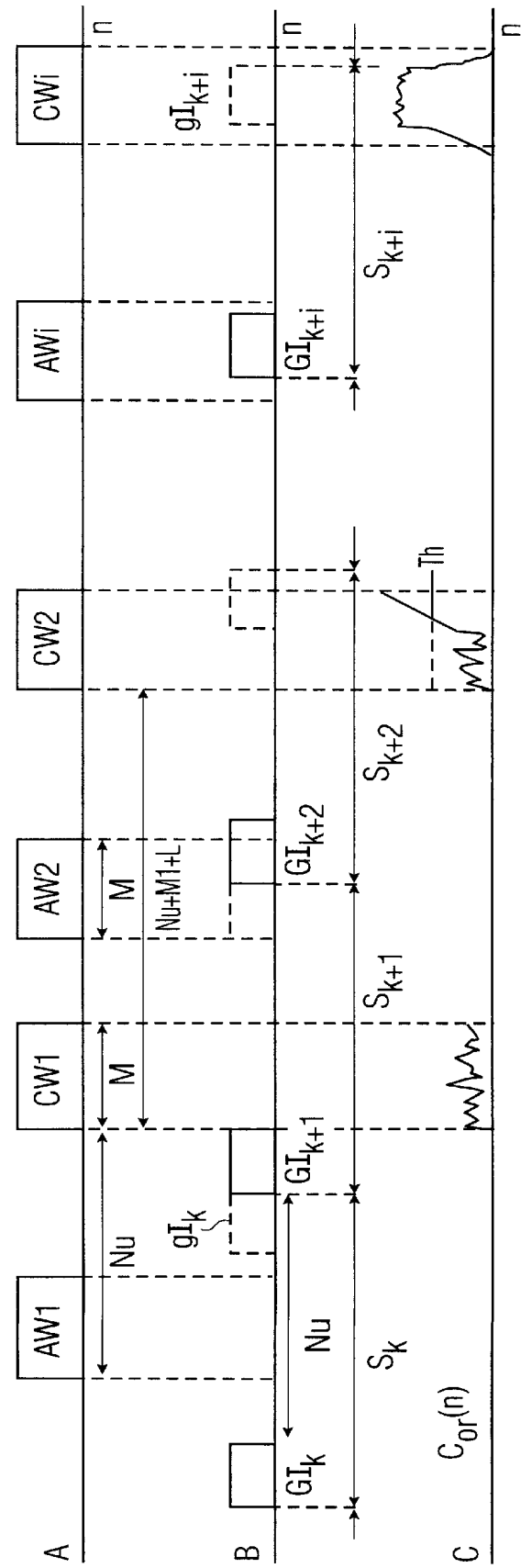
FIG. 6 shows a timing diagram showing locations of the acquisition windows and correlation windows and the correlation signal resulting therefrom.

FIG. 6 shows at reference B a general aspect of the structure of the OFDM symbols $S_k$, $S_{k+1}$, $S_{k+2}$ plotted against time identified in the Figure by the number n of received samples. The symbol Sk has, on the one hand, a guard interval $GI_k$ and, on the other hand, Nu samples which include the data to be decoded. According to the commonly used OFDM technique, the guard interval $GI_k$ forms a copy (made at the transmitter end) of the end $gI_k$ of the Nu data samples. This is indicated in dotted lines in FIG. 6. Thus, each OFDM block has at the symbol start and at the symbol end two occurrences $GI_k$ and $gI_k$ of a group of identical samples. It is this repetition of identical data in the middle of the same symbol that is used for finding back the rate and the structure of the transmitted OFDM symbols. Depending on the formats used at the transmitter end, the duration of the guard interval $GI_k$ and the number Nu of data samples may vary either during a transmission or, more generally, for the different applications. For permitting the receiver to operate with whatever type of transmission format, the invention puts into effect a method of recognizing said format so as to permit of the correct decoding of the transmitted data.

FIG. 6 shows at reference A time conditions for the acquisition windows AW1, AW2 and for the correlation windows CW1, CW2 with respect to the symbols $S_k$, $S_{k+1}$, $S_{k+2}$. The acquisition windows and correlation windows have a width of M symbols. Let us consider the couple of windows AW1 and CWB1 which are chosen and are Nu samples apart. At the appearance of the acquisition window AW1, samples of the symbol $S_k$ are retained in a memory in order to be correlated with those which occur during the appearance of the correlation window CW1. In FIG. 6 is observed that the acquisition window AW1 has not stored the guard interval GIk. Similarly, the correlation window CWB1 does not measure alongside one of the occurrences $gI_k$, $GI_{k+1}$ or $gI_{k+1}$. The correlations which are effected according to the invention between the samples selected via the acquisition window and via the correlation window are represented as C in the FIG. 6. As regards the correlation effected between the samples contained in the windows AW1 and CW1, the result is only the appearance of a noise signal. During the next step, the acquisition window and the correlation window are jointly moved always Nu samples apart. But the distance separating two successive windows of the same kind is then shifted by L samples to be equal to Nu+M+L samples. In this manner, the acquisition window AW2 partly occurs at the same time as the guard interval $GI_{k+2}$. Similarly, the correlation window CW2 partly recovers the end of the symbol $S_{k+2}$ which has the same samples as the guard interval $GI_{k+2}$. The correlation signal Cor(n) which results therefrom therefore shows a considerable increase. The existence of this increase is, for example, detected when the signal Cor(n) transgresses a threshold Th. By following this procedure, there is observed that the correlation signal will show a maximum when the acquisition window coincides with a guard interval $GI_{k+i}$, whereas the correlation window will coincide with the end of the symbol that includes the same data $gI_{k+i}$. This is shown with the couple of windows AWi/CWi represented in FIG. 6, where i is the rank of the windows. The correlation signals Cor(n) represented in FIG. 6 are not of the same scale. By calculating the maximum correlation position relative to the correlation window, it is possible to calculate the duration of the guard interval and to synchronize the windows with the symbols by calculating the shift between the correlation maximum and the correlation window.

Figure 5:
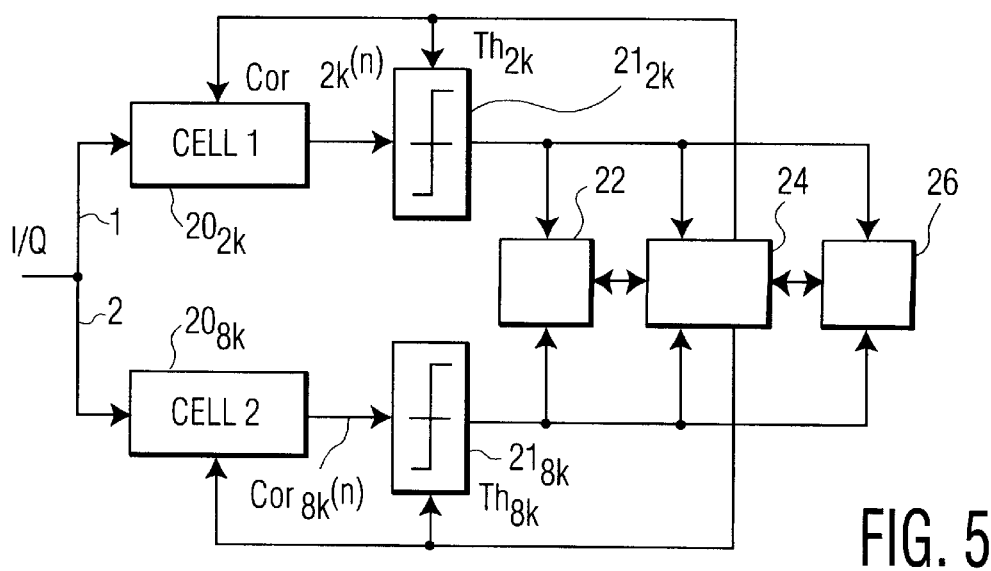
FIG. 5 shows a general diagram of the time synchronization device according to the invention.

FIG. 5 is a general diagram of the time synchronization device 119 according to the invention applied to the case where two different transmission formats are determined. A first channel 1 relates to the determination of a correlation signal $Cor_{2k}(n)$ over Nu=2048 carriers, which corresponds to a FFT of 2048 points. A second channel relates to the determination of a correlation signal $Cor_{8kk}(n)$ over Nu=8192 carriers, which corresponds to a FFT of 8192 points. The digitized complex signals I/Q arrive at two correlation cells $20_{2k}$ and $20_{8k}$ which calculate the correlation signals $Cor_{2k}(n)$ and $Cor_{8kk}(n)$. Two threshold detectors $21_{2k}$ and $21_{8k}$ determine whether the correlation signals are higher than or lower than the thresholds $Th_{2k}$, $Th_{8k}$, respectively. Depending on the result produced by these detectors, the sub-assembly 22 implements the procedure of window offsetting. A control unit 24 carries out the control of the operations which makes it possible to select the transmission format that corresponds to the received complex signals I/Q. A sub-assembly 26 calculates the duration and the position of the guard interval in the window. This positioning is ensured by the sub-assembly 22.

Figure 8:
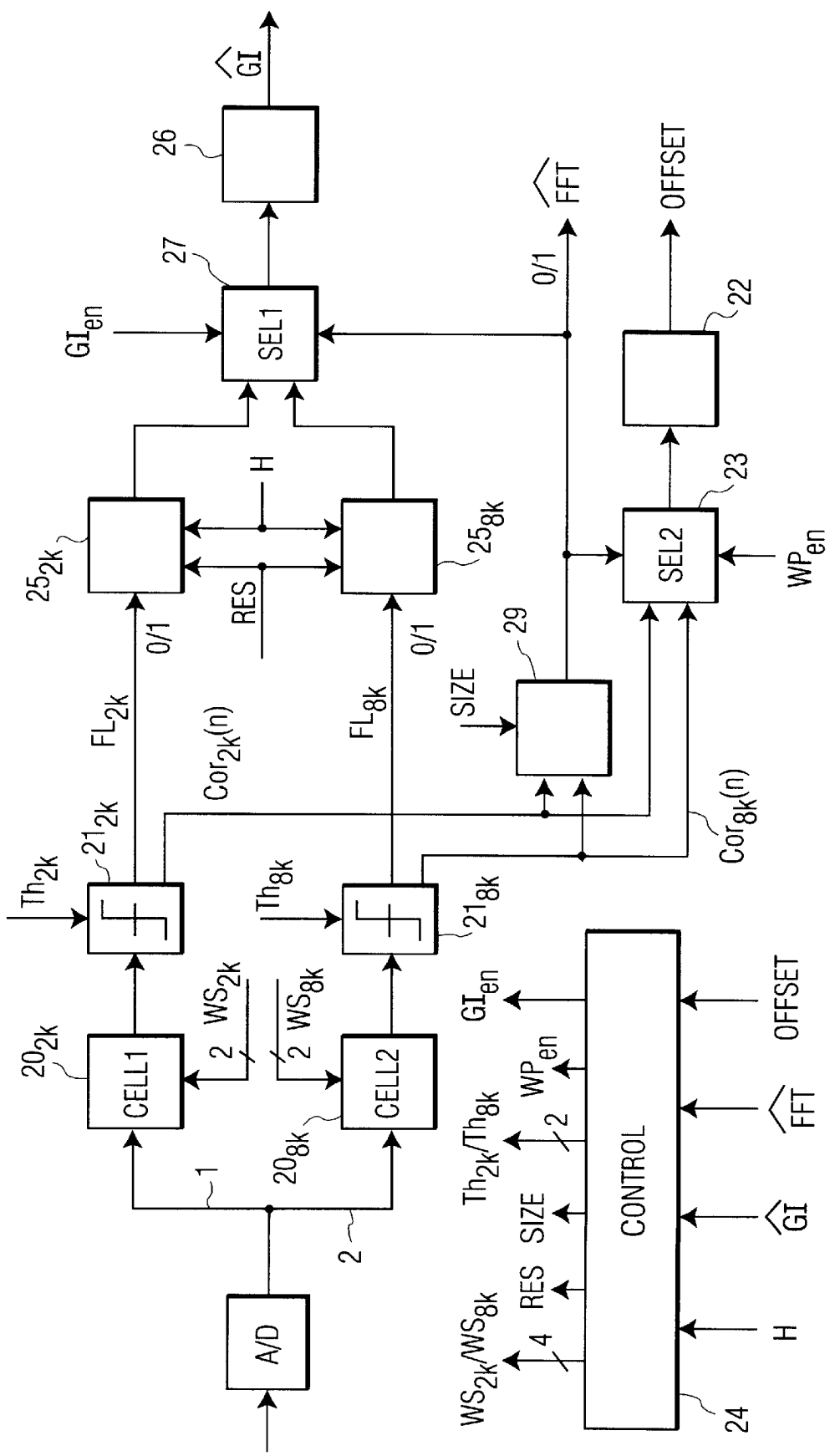
FIG. 8 shows a general diagram of a system according to the invention comprising two channels for carrying out two correlations.

FIG. 8 shows the contents of FIG. 5 in more detail. The correlation cells $20_{2k}$ and $20_{8k}$ are controlled by the signals $WS_{2k}$ and $WS_{8k}$ respectively, which define the strategy applied for carrying out the correlations. The strategy corresponds to a precise positioning of each of the windows for each of the channels. Each channel has a different strategy which changes when the channel under consideration has been estimated as the gaining channel. The object of the evolution of the strategy is to lead to the determination of the FFT and of the guard interval. The strategy is managed by the controller 24 which produces control signals which are necessary for the operations:

signals $WS_{2k}$ and $WS_{8k}$: signals defining the strategy;

signal $WP_{en}$: signal authorizing the transfer of autocorrelated signals which are higher than the threshold and this for the estimation of the start of the OFDM symbol;

signal $GI_{en}$: signal authorizing the transfer of the value of a counter $25_{2k}$ or $25_{8k}$ of the channel selected for carrying out the calculation of the guard interval relating to this channel;

signal SIZE: signal authorizing a change of size of the FFT until the identification of the guard interval. Once this identification has been successful, the size of the FFT may be frozen;

signal RES: signal depending on a new strategy used for resetting the counter unit to zero;

signal Th: signal defining the threshold over which a significant correlation signal is to be taken into account.

The controller 24 takes the produced results into account and thus receives:

signal $\hat{FFT}$: signal including the number of the channel corresponding to the estimated size of the FFT;

signal OFFSET: signal measuring the offset of the position of the correlation peak relative to the correlation window used for determining the start of the OFDM symbol;

signal $\hat{GI}$ signal showing the duration of the guard interval a number of samples;

signal H: sample clock.

When the correlation signal exceeds the threshold, the threshold detector sends a signal which increments the counter $25_{2k}$, $25_{8k}$ placed in the channel. At the beginning, either channel may be selected. This selection is carried out on the basis of the amplitude of the correlation peaks measured on each channel. Therefore, the amplitudes of the correlation peaks are compared in a comparator 29 which determines the size of the FFT by producing a signal $\hat{FFT}$. This signal activates a first selector SEL1 27 which connects the selected channel to the calculation device 26 which determines the duration of the guard interval and which produces the signal $\hat{GI}$. In the same manner, the signal $\hat{FFT}$ activates a second selector 23 which transmits the amplitude of the correlation signal from the selected channel to a calculation unit 22 which measures the offset that exists between the correlation maximum and the start of the correlation window.

Figure 7:
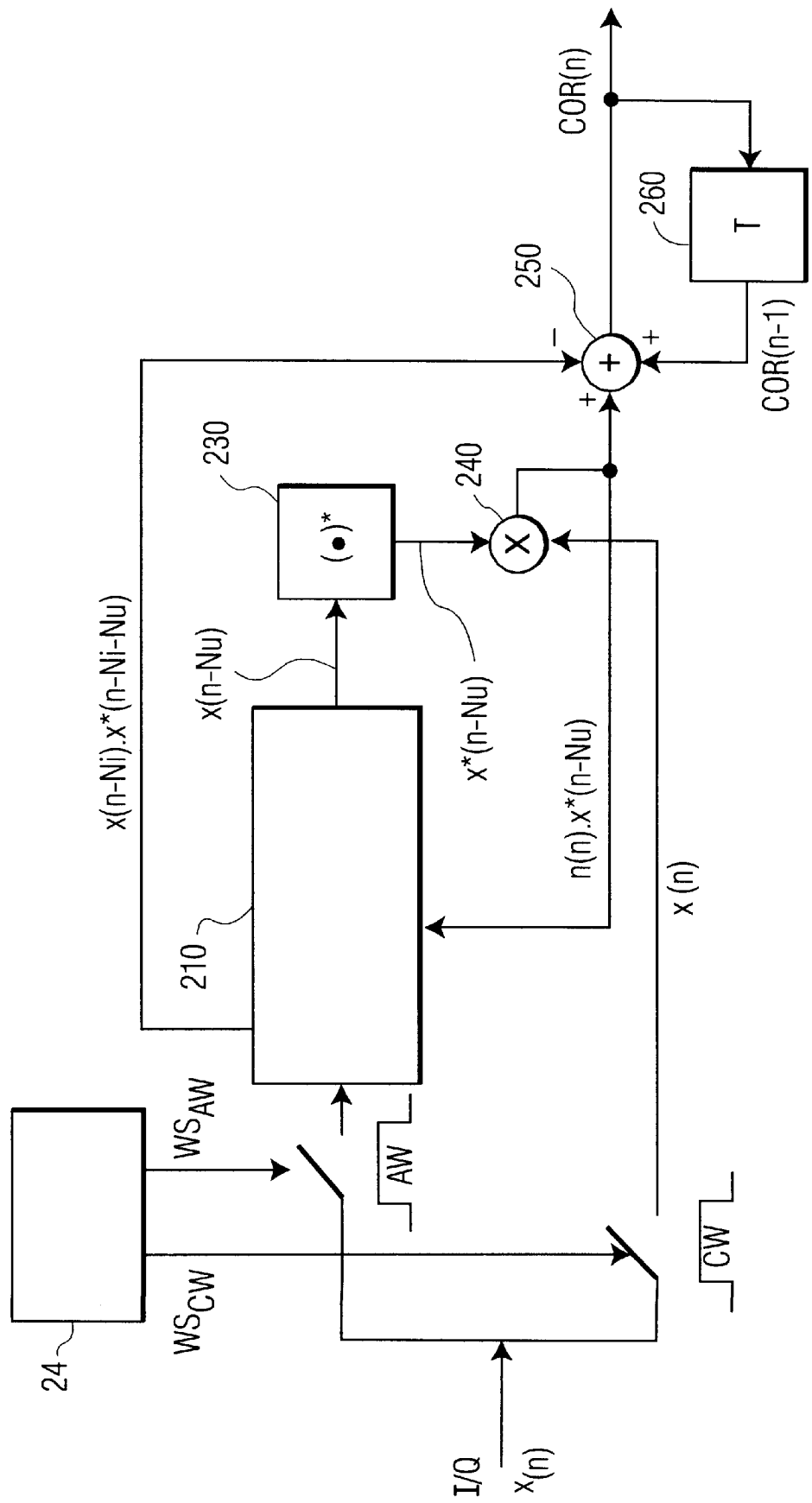
FIG. 7 shows a diagram of a correlation cell according to the invention.

The diagram of a correlation cell is represented in FIG. 7. It comprises a memory unit 210 which operates in the FIFO mode. The memory unit 210 receives the first sequence of complex input symbols x(n) (complex symbols I/Q) during the opening of the acquisition window AW whose duration and time position are determined by the control unit According to the method that has been described, the correlation window CW is opened by the controller 24 with a delay of Nu samples relative to the window AW to select a second sequence of complex symbols x(n). At the same time, the output of the memory unit produces data x(n−Nu) which are transformed into conjugate data x*(n−Nu) in a transformation sub-assembly 230. A multiplier unit 240 multiplies the second sequence x(n) by the conjugate data x*(n−Nu) and produces x(n).x*(n−Nu). A correlation signal Cor(n) is calculated with a sliding window which is moved within the correlation window CW. The accumulation of the signal x(n).x (n−Nu) in the sliding window Ni determines the correlation signal Cor(n) according to:

$$Cor(n) = \sum_{k=n-Ni+1}^{n} x(k)x*(k-Nu).$$

This equation may also be written in the form of:

$$Cor(n)=Cor(n-1)+x(n).x*(n-Nu)-x(n-Ni).x*(n-Ni-Nu).$$

The length of the sliding window Ni must remain less than or equal to the smallest length of the currently identified guard interval Ng of the channel under consideration, that is to say, Ni=Ng$_{min}$ during the phase in which the size of the FFT and the width of the guard interval are determined;

Ni=$\hat{Ng}$ where $\hat{Ng}$ is the estimate of Ng after the width of the guard interval has been identified.

The correlation cell carries out the following operations:

storage of the received samples x(n) in the memory while the acquisition window is open. Because of the offset of Nu samples between the opening of the acquisition window AW and that of the correlation window CW, the samples leaving the memory are referenced x(n−Nu) while the current samples selected via the correlation window CW are called x(n);

transformation of the stored data x(n−Nu) into conjugate data x*(n−Nu);

in the multiplier 240, calculation of x(n).x*(n−Nu);

selection of the data x(n−Ni).x*(n−Ni−Nu);

in an adder/subtracter 250, subtraction of x(n).x*(n−Nu) and x(n−Ni).x (n−Ni−Nu) and addition of the result to Cor(n−1) to produce the correlation signal Cor(n) at the instant n;

in a delay device 260, offset of the signal Cor(n) by one clock period to be used in the next period.

Figure 3:
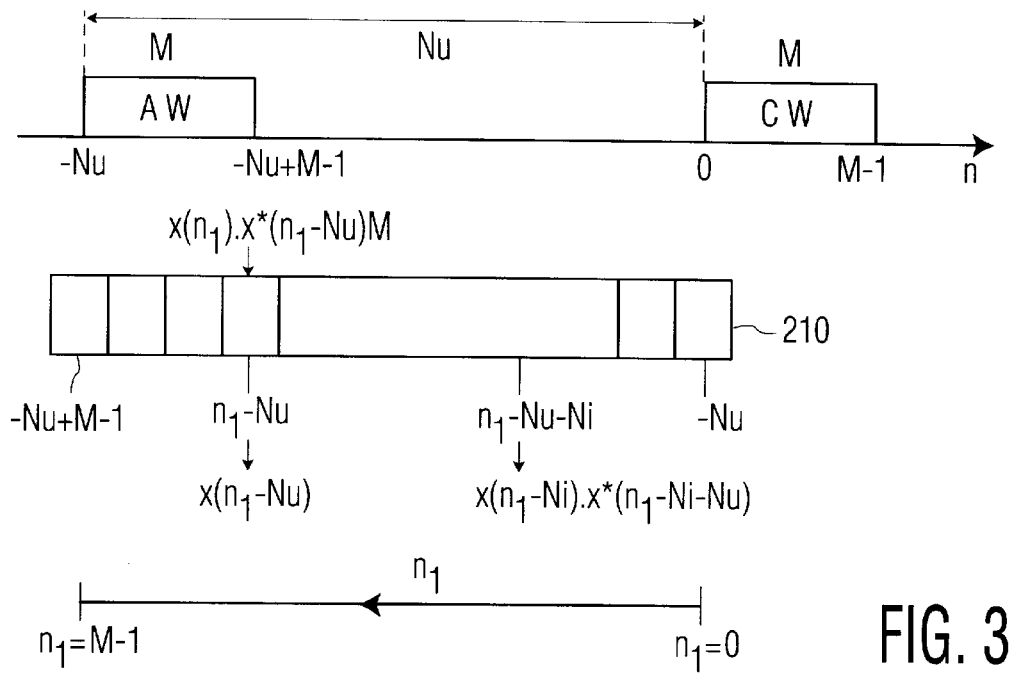

The operation of the memory unit 210 takes place in the following manner (see FIG. 3):

at the instant n=n1 (referenced relative to the start of the window CW), where n1 lies between 0 and M−1, x(n1).x*(n1−Nu) is calculated and stored at the memory location where x(n1−Nu) was stored. The signal x(n1−Ni).x*(n1−Ni−Nu) begins to act from the instant it exists onwards, that is to say, at the instant n when it is higher than or equal to Ni.

Figure 9:
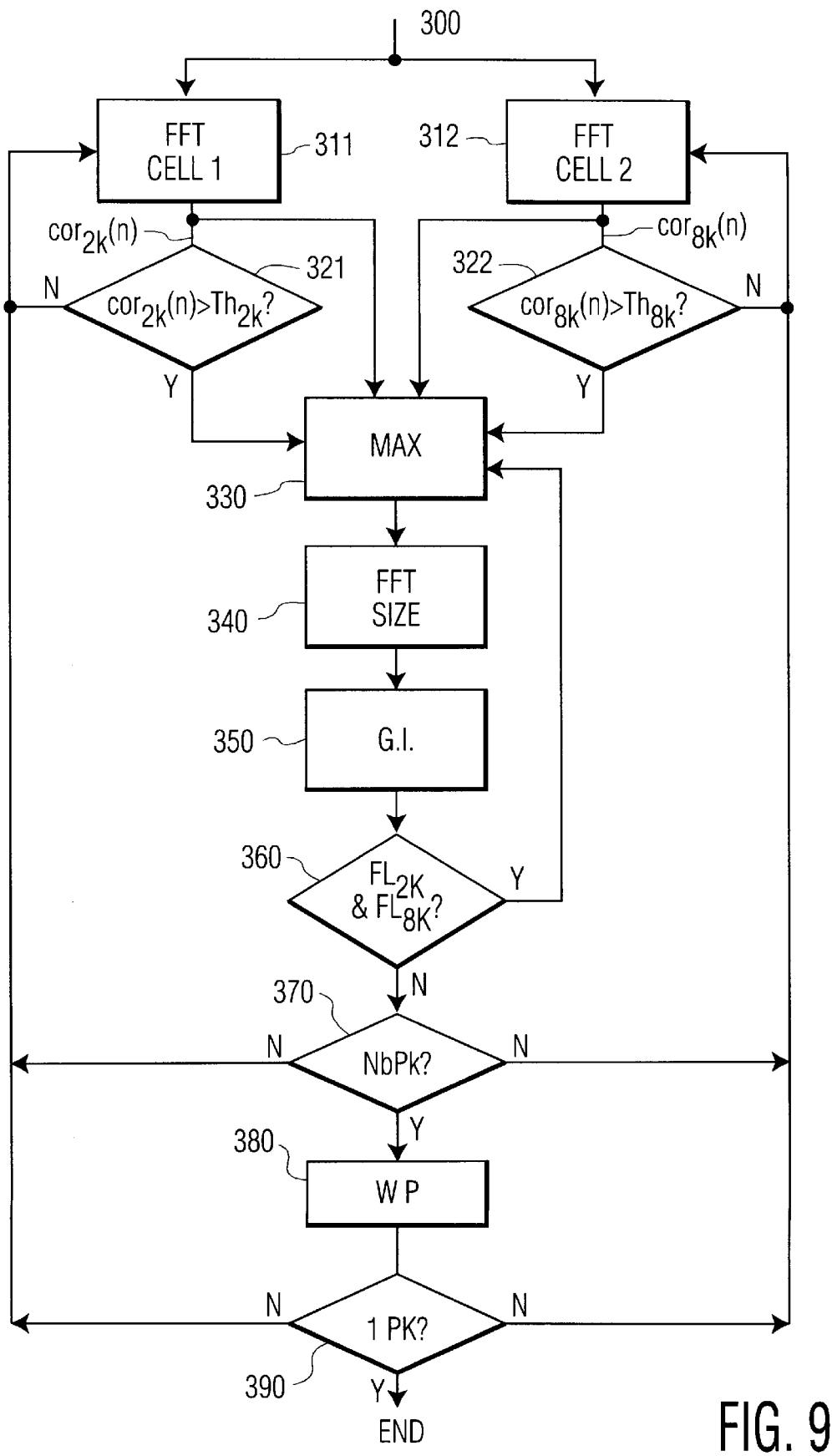
FIG. 9 shows a flow chart which represents various steps of the method according to the invention.

FIG. 9 shows a flow chart of the various steps of the method according to the invention in the case where two different transmit formats are determined which are determined in accordance with the diagram shown in FIG. 8. The method starts with the calculation of the correlation signals in the cells CELL1 and CELL2 to produce the signals Cor$_{2k}$(n) and Cor$_{8k}$(n) respectively, during the steps 311 and 312. During the steps 321 and 322, the signals are compared with the thresholds Th$_{2k}$ and Th$_{8k}$ respectively, the respective results of these comparisons forming the flags FL$_{2k}$ and FL$_{8k}$. If the threshold is not exceeded (negative result N), the steps 311 and 312 are started again. If the threshold is exceeded (positive result Y), one of the signals Cor$_{2k}$(n) or Cor$_{8k}$(n) that has the maximum amplitude is determined during step 330. Based on the signal that has the maximum amplitude, the size of the FFK (2 k or 8 k) (step 340) is determined as is the duration of the guard interval (step 350) calculated via the correction cell of the identified FFT.

When the steps 321 and 322 take place, one of the steps, step 321 for example, may produce a positive result whereas the other step 322 produces a negative result which causes the cell CELL to start step 312 again. For this reason, it is necessary at the end of step 350 to verify that the step 322 has not produced a positive result while the steps 330, 340 and 350 were run. This verification is carried out during step 360. If FL$_{2k}$ and FL$_{8k}$ are positive at the same time (state Y), the step 360 causes the method to be resumed at step 330 to determine again which of the signals Cor$_{2k}$(n) or Cor$_{8k}$(n) has the maximum amplitude. It is necessary to reset to zero the flag of the channel that is not selected. If the signals Cor$_{2k}$(n) and Cor$_{8k}$(n) do not have the positive state (Y) at the same time, the method proceeds to step 370 which determines whether the number of detected correlation peaks corresponds to the number of OFDM symbols used for this determination. If the number of peaks is not correct, the method is resumed at steps 311 or 312. If this number is correct, the method proceeds to step 380 to calculate the position of the correlation window. It is ensured that the window is correctly positioned in that another verification is carried out during step 390 which determines whether there is actually a single correlation peak in the window positioned in this manner. If this verification is negative (result N), the window is not correctly positioned and the method is resumed at steps 311 and 312. If the result is positive (Y), the time synchronization system is correctly defined and the receiver is ready to operate.

What is claimed is:

1. A method of determining a transmission format for complex symbols in a signal formatted in complex symbol blocks, each block having a first occurrence of a group of complex symbols and a second occurrence of the same group of complex symbols, the two occurrences having a like duration, the method effecting a correlation between the first occurrence and the second occurrence for determining characteristic features of the transmission format, characterized in that the method comprises the following steps:

storing a first sequence of complex symbols taken from a received signal via an acquisition time window which has a longer duration than the duration of the occurrences of complex symbols, correlating the first sequence of complex symbols with a second sequence of complex symbols selected at another moment in the received signal, via a correlation time window which has a duration equal to that of the acquisition time window, and determining characteristics of the transmission format by searching for maximum correlation between the first and the second sequences of complex symbols by synchronizing the acquisition window with the received signal and by positioning the acquisition time window and the correlation time window relative to each other in time, the maximum correlation appearing when the first and second sequences of complex symbols include said first and second occurrences, respectively.

2. The method as claimed in claim 1, the signal being an orthogonal frequency-division multiplexing (OFDM) signal, characterized in that the method determines a number of orthogonal frequencies included in at least one transmission format of the OFDM signal.

3. A transmission system for transmitting an orthogonal frequency-division multiplexing (OFDM) signal, the system comprising:

transmission means for transmitting said signal formatted in blocks of complex symbols in accordance with a transmission format, each block comprising a first occurrence of a group of complex symbols and a second occurrence of the same group of complex symbols, the two occurrences having a like duration; and receiving means comprising means for receiving said signal and correlation means for determining a correlation between the first occurrence and the second occurrence to determine characteristic features of the transmission format;

characterized in that the correlation means comprises:

means for selecting and storing a first sequence of complex symbols selected in the received signal via an acquisition time window which has a duration that is longer than the duration of the occurrences of complex symbols, means for selecting a second sequence of complex symbols which is selected at another moment in the received signal via a correlation time window which has a duration equal to that of the acquisition time window, the correlation means effecting the correlation between the first sequence and the second sequence of complex symbols, and means for determining the characteristic features of the transmission format by searching for maximum correlation between the first sequence and the second sequence of complex symbols by synchronizing the acquisition window with the received signal and by positioning the acquisition time window and correlation time window with respect to each other in time, the maximum correlation occurring when the first and the second sequence of complex symbols include said first and second occurrences, respectively.

4. The system as claimed in claim 3, characterized in that the receiving means comprises various channels running in parallel and permitting the determination of various transmission formats.

5. The system as claimed in claim 4, characterized in that the channels operate simultaneously.

6. A receiver for receiving an orthogonal frequency-division multiplexing (OFDM) signal, the signal being formatted in blocks of complex symbols which are in conformity with a transmission format, each block having a first occurrence of a group of complex symbols and a second occurrence of the same group of complex symbols, the two occurrences having a like duration, and the receiver comprising means for receiving said signal and correlation means for determining a correlation between the first occurrence and the second occurrence to determine characteristic features of the transmission format for detecting the received signal;

characterized in that the correlation means comprises:

means for selecting and storing a first sequence of complex symbols selected in the received signal via an acquisition time window which has a duration that is longer than the duration of the occurrences of complex symbols, means for selecting a second sequence of complex symbols which is selected at another moment in the received signal via a correlation time window which has a duration equal to that of the acquisition time window, the correlation means effecting the correlation between the first sequence and the second sequence of complex symbols, and means for determining the characteristic features of the transmission format by searching for maximum correlation between the first sequence and the second sequence of complex symbols by synchronizing the acquisition window with the received signal and by positioning the windows with respect to each other in time, the maximum correlation occurring when the first and the second sequence of complex symbols include said first and second occurrences, respectively.

7. The receiver as claimed in claim 6, characterized in that the receiving means comprises various channels running in parallel and permitting the determination of various transmission formats.

8. The receiver as claimed in claim 7, characterized in that the channels operate simultaneously.

* * * * *